US008760109B2

(12) United States Patent
Cavarec et al.

(10) Patent No.: US 8,760,109 B2

(45) Date of Patent: Jun. 24, 2014

(54) METHOD FOR OPERATING A MOTORIZED SOLAR PROTECTION HOME AUTOMATION INSTALLATION

(75) Inventors: Pierre-Emmanuel Cavarec, Mont Saxonnex (FR); Fabien Rousseau, Cluses (FR)

(73) Assignee: Somfy SAS, Cluses (FR)

(*) Notice: Subject to any disclaimer, the term of this patent is extended or adjusted under 35 U.S.C. 154(b) by 276 days.

(21) Appl. No.: 13/143,499

(22) PCT Filed: Dec. 29, 2009

(86) PCT No.: PCT/IB2009/055972

§ 371 (c)(1), (2), (4) Date: Jul. 6, 2011

(87) PCT Pub. No.: WO2010/079407

PCT Pub. Date: Jul. 15, 2010

(65) Prior Publication Data

US 2011/0265956 A1 Nov. 3, 2011

(30) Foreign Application Priority Data

Jan. 6, 2009 (FR) ...................................... 09 00022

(51) Int. Cl.
*H01M 10/46* (2006.01)
*H01M 10/44* (2006.01)
*E05F 15/20* (2006.01)

(52) U.S. Cl.
USPC ................................................ 320/101; 160/5

(58) Field of Classification Search
USPC ................................................ 160/5; 320/101
See application file for complete search history.

(56) References Cited

U.S. PATENT DOCUMENTS

| | | | | |
|---|---|---|---|---|
| 5,682,305 | A * | 10/1997 | Kurokami et al. | 363/79 |
| 2007/0240832 | A1* | 10/2007 | Cavarec | 160/70 |
| 2008/0067227 | A1* | 3/2008 | Poss et al. | 232/17 |
| 2008/0163984 | A1* | 7/2008 | Lambey | 160/2 |
| 2009/0308543 | A1* | 12/2009 | Kates | 160/5 |
| 2010/0330898 | A1* | 12/2010 | Daniels | 454/365 |

FOREIGN PATENT DOCUMENTS

| | | | |
|---|---|---|---|
| DE | 20000681 | U | 5/2000 |
| FR | 2823527 | A | 10/2002 |

* cited by examiner

*Primary Examiner* — Drew A Dunn
*Assistant Examiner* — David Henze-Gongola
(74) *Attorney, Agent, or Firm* — Frommer Lawrence & Haug LLP; Ronald R. Santucci

(57) ABSTRACT

A method for operating a motorized solar protection home automation installation, comprising:
- an actuator intended to unfold and fold up a fabric, comprising a motor and a motor control module, and
- a panel of photovoltaic cells that is fixed or mobile under the effect of the actuator, intended to supply energy to recharge a reserve of electrical energy powering the actuator, the operating method comprising the following automatic steps:
- determination of a criterion for recharging the energy reserve,
- if the criterion is satisfied, displacement of the panel of photovoltaic cells or of the fabric to a recharging position in which the panel is exposed directly or by reflection to the solar rays to recharge the energy reserve.

18 Claims, 10 Drawing Sheets

METHOD FOR OPERATING A MOTORIZED SOLAR PROTECTION HOME AUTOMATION INSTALLATION

This application is a 371 of PCT/IB2009/055972 filed on Dec. 29, 2009, published on Jul. 15, 2010 under publication number WO 2010/079407, which claims priority benefits from French Patent Application Number 09 00022 filed Jan. 6, 2009, the disclosure of which is incorporated herein by reference.

BACKGROUND OF THE INVENTION

The invention relates to the field of solar protection installations, in particular motorized installations, for which the power supply is autonomous, not linked to a power supply network.

DESCRIPTION OF THE PRIOR ART

FIG. 1 represents a solar protection installation 1 according to the prior art. The installation is mounted on a wall 2 provided with eaves 3. A mount 4 fixed to the wall supports an enclosure 5 in which is wound a fabric 6, represented by dotted lines in the enclosure and by solid lines outside the enclosure. The free end of the fabric is fixed to a load bar 8, this being maintained by arms 7 fixed to the enclosure or to the wall. The arms 7 are arms that can be unfolded under the action of an elastic force. The combined action of an actuator (not represented) and of the arms makes it possible to unfold and fold up the fabric in the enclosure.

The actuator is provided with a control module (not represented) and is powered via an energy reserve 10 placed inside the enclosure or close to it. A panel of photovoltaic cells is placed on the enclosure, so as to optimize the electrical connection between the panel and the energy reserve: a single cable 11 passes into the enclosure.

Also known, for example from the document FR2823527 is an autonomous solar protection installation, for which the panel of photovoltaic cells is incorporated in the fabric of the blind. This type of installation presents the disadvantage of not offering any possible recharging when the blind remains in a wound position.

Another example of such an autonomous solar protection installation is described in the document DE20000681U: the panel of photovoltaic cells is mounted on the load bar. The energy recovered by these cells is accumulated in an energy reserve situated in the enclosure, by virtue of a connecting cable passing from the load bar to the enclosure via the fabric or via the arms. A radio receiver enables the blind to be remotely driven.

These constructions allow the blind to be installed easily, inasmuch as all the elements needed for its operation are incorporated. However, it does not offer any real solution when the solar protection installation is mounted under eaves overhanging or under a balcony. In this case, the panel of photovoltaic cells is also sheltered from direct solar radiation, which greatly reduces its energy generation capabilities.

It is then known to remotely locate the panel of photovoltaic cells on other surfaces, for example the wall or the exposed surface of the eaves. The installation then loses its integrated system qualities.

Whether it is on the enclosure, the load bar or remotely situated, the panel is fairly strongly exposed to bad weather (rain, hail, snow). The degradations that these can cause (soiling or nonrepairable degradations) adversely affect the performance levels of the panel. It therefore becomes fairly realistic to place the installation in the shelter of a balcony or of eaves, despite the resulting problems described above.

The document DE20000681U also describes particular operating features, notably linked to the energy reserve. A first behavior occurs when a command to unfold the fabric of the blind is given. This command is inhibited if the energy reserve is insufficient to ensure the consecutive unfolding and folding up of the fabric.

A second behavior occurs when, with the fabric unfolded, the energy level falls below a certain threshold. The control electronic circuitry then ensures the folding up of the fabric, so as to avoid having the latter remain in the unfolded position.

Moreover, the use of various sensors (wind, rain, temperature) also influences the behavior of the installation.

SUMMARY OF THE INVENTION

The aim of the invention is to provide a method for operating a blind device that remedies the drawbacks described and that improves the operating methods known from the prior art. In particular, the invention makes it possible to ensure a charging of the energy reserve even in conditions of installation sheltered from solar rays, for example when the blind is installed under eaves or under a balcony, and including when the panel of photovoltaic cells is not exposed when the fabric of the blind is wound up into the enclosure.

The method according to the invention governs the operation of a motorized solar protection home automation installation comprising:

- an actuator intended to unfold and fold up a fabric, comprising a motor and a motor control module, and
- a panel of photovoltaic cells that is fixed or mobile under the effect of the actuator, intended to supply energy to recharge a reserve of electrical energy powering the actuator.

The operating method comprises the following automatic steps:

a) determination of a criterion for recharging the energy reserve, b) if the criterion is satisfied, displacement of the panel of photovoltaic cells or of the fabric to a recharging position in which the panel is exposed directly or by reflection to the solar rays to recharge the energy reserve.

The recharging criterion may correspond to:

- a level of energy available in the energy reserve below a first predefined threshold, and/or
- a power converted by the panel of photovoltaic cells when the blind is in a completely folded-up position, below a second threshold.

The recharging position may be a position of partial unfolding of the blind.

The fabric being in the recharging position, it may be folded up if the rate of variation of the stored energy falls below a third threshold.

The recharging position may be determined by automatic learning, in particular by a procedure for controlling movements of the blind to a position in which the ratio of the exposed surface zone of panel of photovoltaic cells to the unfolded fabric length is maximized.

The recharging position may be a folded-up position of the blind in case of wind.

The recharging position may vary according to sunlight conditions and/or according to the orientation of the solar rays.

The fabric may unfold to a recharging position during the step b) under certain unfolding conditions, these being predefined automatically or manually by an installer.

The method according to the invention governs a motorized solar protection home automation installation, comprising:

- an actuator intended to unfold and fold up a fabric, comprising a motor and a motor control module, and
- a panel of photovoltaic cells that is fixed or mobile under the effect of the actuator, intended to supply energy to recharge a reserve of electrical energy powering the actuator.

The operating method comprises the following automatic steps:

a) displacement of the panel of photovoltaic cells or of the fabric to a recharging position in which the panel is exposed directly or by reflection to the solar rays,
b) use of a measurement of energy supplied by the panel to determine a sunlight criterion,
c) unfolding of the fabric of the blind if the sunlight criterion exceeds a predefined threshold.

According to the invention, a motorized solar protection home automation installation comprises:

- an actuator intended to unfold and fold up a fabric, comprising a motor and a motor control module, and
- a panel of photovoltaic cells that is mobile under the effect of the actuator, intended to recharge a reserve of electrical energy powering the actuator.

It is characterized in that it comprises hardware and software means for implementing the operating method defined previously.

The hardware and software means may comprise a means for determining the level of energy available in the energy reserve and/or a means for determining the power converted by the panel of photovoltaic cells.

The invention also relates to a computer program comprising a computer program code means suitable for controlling steps of the operating method defined previously, when the program runs on a computer.

The appended drawing represents, by way of examples, various embodiments of a home automation transmitter according to the invention.

DESCRIPTION OF THE PREFERRED EMBODIMENTS

Figure 2:
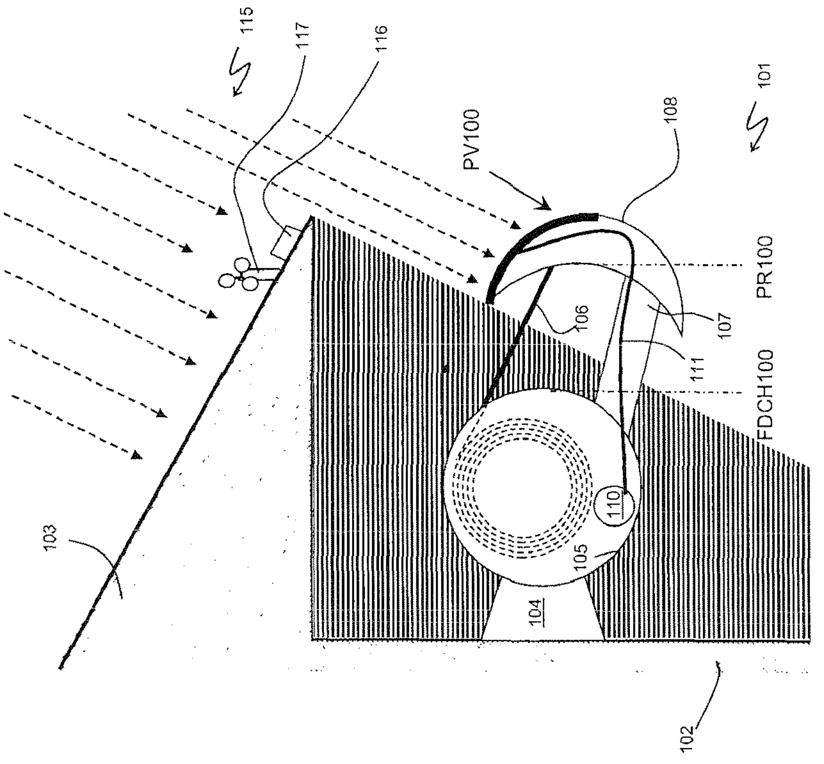
FIGS. 2 and 3 are diagrams of two embodiments of a solar protection installation operating according to the method that is the subject of the invention.

A first embodiment of a solar protection installation 101 represented in FIG. 2 is mounted on a wall 102 provided with eaves 103. A base 104 fixed to the wall supports an enclosure 105 in which is wound a fabric 106, represented by dotted lines in the enclosure and by a solid line outside the enclosure. The free end of the fabric is fixed to a load bar 108, the latter being maintained by arms 107 fixed to the enclosure or to the wall. The arms are arms that can be unfolded under the action of an elastic force providing the tension for the fabric. The combined action of an actuator (not represented) and of the arms makes it possible to unfold and fold up the fabric in the enclosure.

The actuator is provided with a control module (not represented) and is powered via an energy reserve 110 placed in the enclosure or close to the latter. A panel of photovoltaic cells PV100 is placed on the load bar. It is linked to the energy reserve notably by a cable 111, the cable running, for example, along the arms.

In this installation, the assembly comprising fabric winding tube, fabric, load bar and arms forms a blind. The panel of photovoltaic cells is mobile with the fabric.

The installation 101 is represented in a position that is called recharging position PR100. This position is offset relative to a top end-of-travel position FDCH100, or end-stop position, in which the fabric is completely wound or considered as such. This top end-of travel position may also correspond to the position in which the load bar is in contact with the enclosure of the blind and closes the latter. The recharging position is defined, for example, by a determined intermediate position or by a determined length of unwinding of the fabric.

Figure 1:
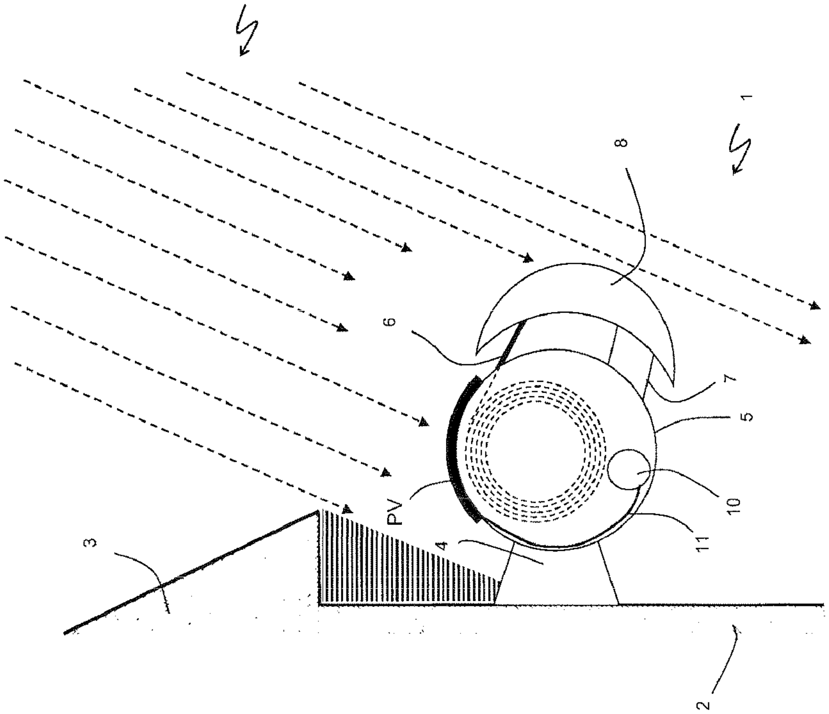
Fig. 1 Prior art
FIG. 1 is a diagram of a solar protection installation known from the prior art.

The eaves 103 extend much further than in FIG. 1. They create a shadow zone with respect to the solar rays 115, represented by horizontal shading lines, in which the installation is located when the blind is in the top end-of-travel position.

In the recharging position, the panel is preferentially completely exposed to the solar radiation that is present. However, it is also possible for only a useful portion to be exposed (at least a portion of the panel is located out of the shade of the eaves or of the balcony, that is to say outside the shadow zone).

The panel of photovoltaic cells placed on the load bar is at least partially out of this shadow zone only when the load bar is displaced at least to the recharging position PR100 that is represented.

This recharging position obviously depends on the overhang of the eaves, on the height at which the blind is installed relative to the eaves and on the angle of inclination of the solar rays.

The panel of photovoltaic cells being placed on the load bar, the latter generates a small quantity of energy when it is situated in the shadow zone. It is thus much less powerful than when it is exposed to the direct solar radiation outside the shadow zone.

Any position in which the panel of photovoltaic cells is exposed to the maximum to the direct solar radiation is thus a position of maximum performance. On the other hand, when the blind is unfolded, it is more sensitive to the outdoor climatic conditions (rain, wind, sun, temperature). Furthermore, it is essential to avoid having an automatic recharging unfolding behavior considered as strange or disturbing by a user.

A solar sensor 116 and an anemometer 117 are used to test the climatic conditions relating to the presence of wind and sun. The anemometer may also take the form of a wind sensor fixed to the blind installation itself.

Figure 3:
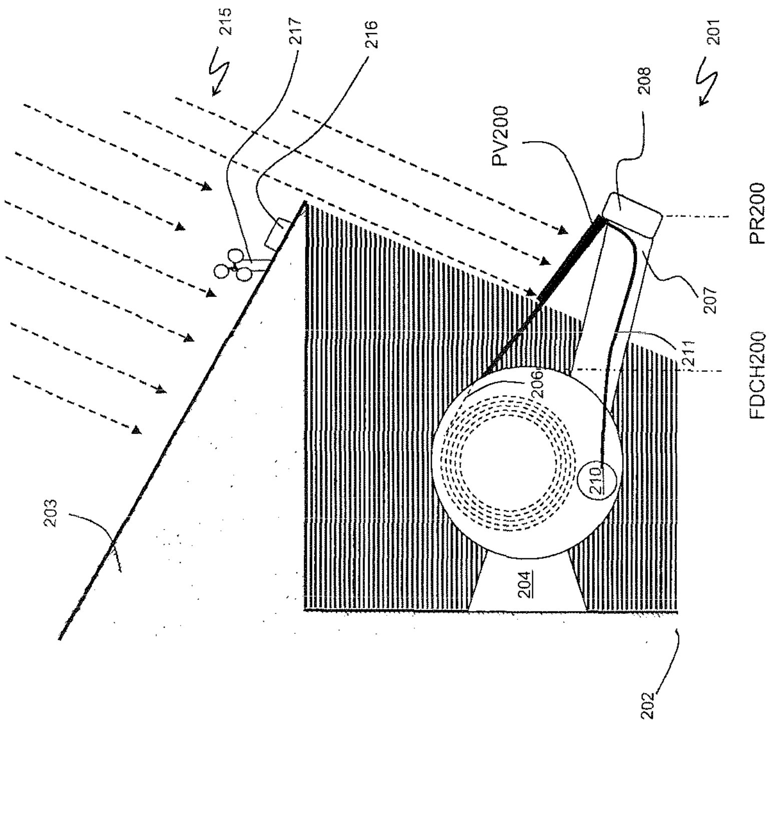

A second embodiment of solar protection installation 201 is represented in FIG. 3. FIG. 3 uses the same references as previously in FIG. 2, increased by 100. A panel of photovoltaic cells PV200 is placed, not on the load bar, but on the fabric in proximity to the load bar; it extends, for example, along the load bar. It is linked to the energy reserve notably by a cable 211. In this figure, the panel is deliberately represented by a thick line. However, the panel of photovoltaic cells may be incorporated in the fabric, and not necessarily form any overthickness relative to the rest of the fabric.

The panel of photovoltaic cells placed on or in the fabric along the load bar leaves the shadow zone created by the eaves 203 only when the load bar is displaced at least to the recharging position PR200 represented.

The panel of photovoltaic cells fixed to the fabric of the blind is exposed to the solar rays only when the blind is displaced at least to the recharging position. In this recharging position, the panel is preferentially completely exposed to the solar radiation that is present. However, it is also possible for only a useful portion to be exposed. When the fabric is fully wound and in its top end-of-travel position FDCH200, no energy is generated by the panel. In the same way as previously, when the blind is unfolded, it is sensitive to the outdoor climatic conditions (rain, wind, sun, temperature). Furthermore, it is essential to avoid having an automatic recharging unfolding behavior considered as strange by a user. This also applies to the embodiments described below.

Figure 8:
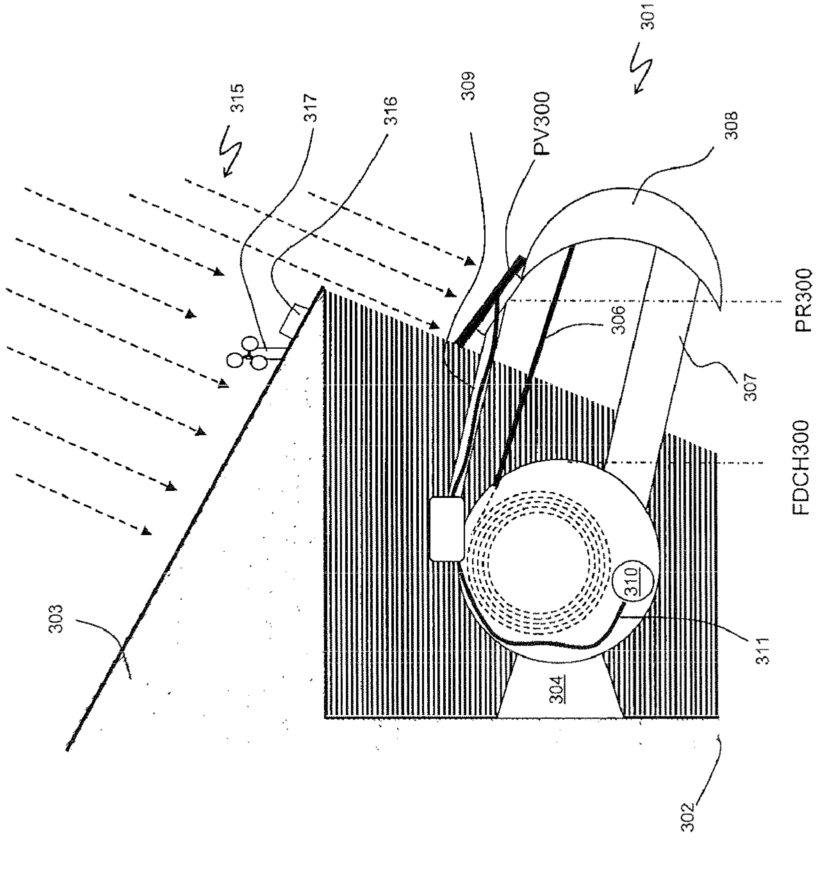
FIGS. 8, 9 and 10 are respective diagrams of third, fourth and fifth embodiments of a solar protection installation operating according to the method that is the subject of the invention.

A third embodiment of solar protection installation 301 is represented in FIG. 8. FIG. 8 uses the same references as previously, increased by 100.

The installation 301 of FIG. 8 differs from the installations described previously in that the panel of photovoltaic cells PV300 is mobile relative to the enclosure of the blind, its movement being only indirectly linked to the movements of the fabric. In particular, the panel of photovoltaic cells is itself mounted on arms 309 that can be folded up, fairly similar to those of the blind. These arms make it possible to displace the panel of photovoltaic cells from a first folded-up position to a second unfolded position in which the panel of photovoltaic cells is exposed to the solar rays.

The movement of the panel of photovoltaic cells to the second unfolded position can be generated under the effect of springs associated with the arms 309 when a force constraining the panel of photovoltaic cells in the first folded-up position is relaxed. This force may be the action of an electromagnet driven from the control module or, more advantageously, a mechanical element of the load bar. Thus, the simple presence of the load bar blocks the panel in its folded-up position. When the load bar is displaced, by unfolding of the fabric, this force is relaxed and the panel of photovoltaic cells is unfolded with the fabric to the recharging position PR300.

Alternatively, the panel could slide along slideways, for example telescopic slideways, replacing the arms. Springs in the slideways make it possible to displace the panel to the recharging position.

The panel of photovoltaic cells is advantageously folded up with the fold-up movement of the fabric. Thus, the unfolded position of the panel of photovoltaic cells corresponds to an unfolding of the fabric in at least a recharging position, the panel of photovoltaic cells then being exposed to the solar rays outside the shadow zone created by the eaves.

Figure 9:
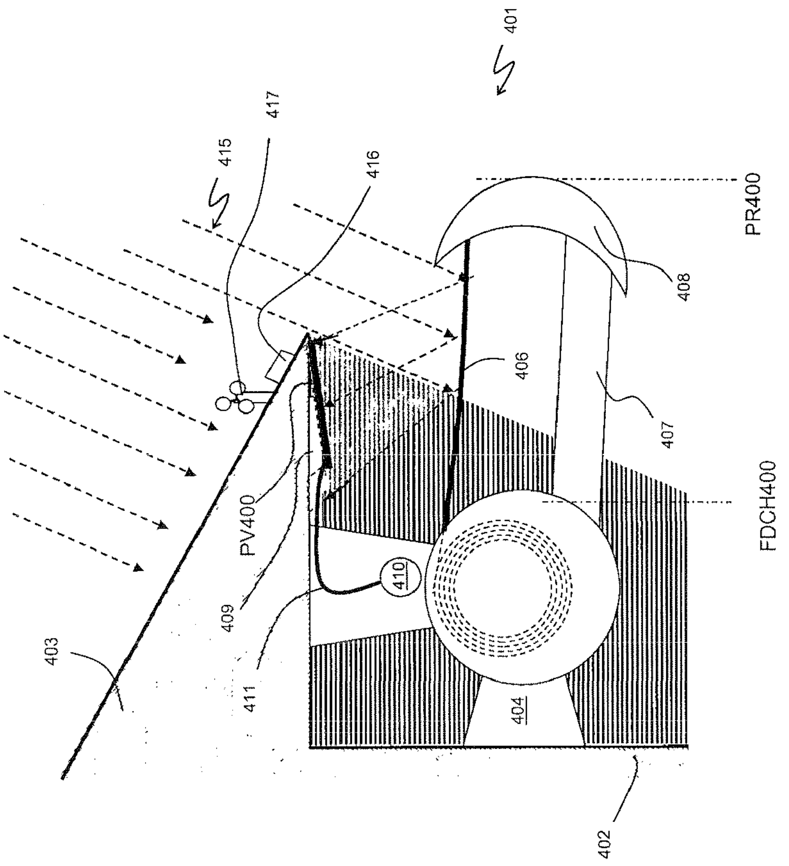

A fourth embodiment of solar protection installation 401 is represented in FIG. 9. FIG. 9 uses the same references as previously, increased by 100.

Installation 401 of FIG. 9 differs from the installations described previously in that the panel of photovoltaic cells PV400 is mounted on the structure, but in a position in which it does not directly receive the solar radiation. Thus, unlike the installations of the prior art which use a remotely-sited panel of photovoltaic cells, the latter is mounted in proximity to the installation, without creating wiring problems. Advantageously, the panel of photovoltaic cells is mounted on a support 409 under the eaves 403, the cells being directed on the side of the fabric of the blind.

The panel of photovoltaic cells receives the solar rays reflected by a portion of the fabric, when the latter is unfolded to its recharging position PR400. To this end, the fabric comprises a reflecting portion mounted on the fabric or incorporated therein.

Figure 10:
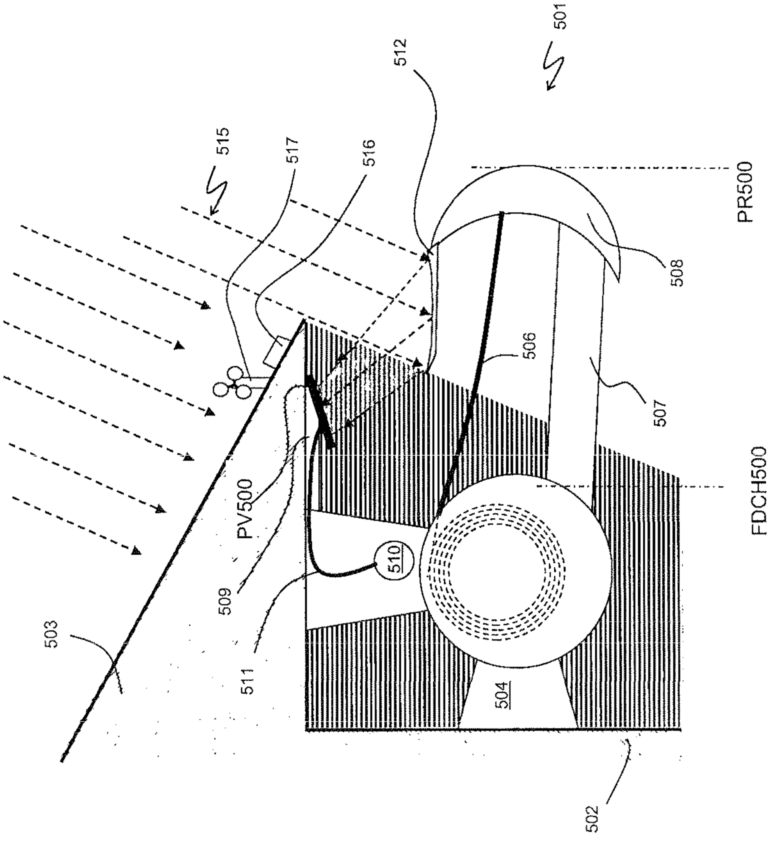

A fifth embodiment of solar protection installation 501 is represented in FIG. 10. FIG. 10 uses the same references as previously, increased by 100. The embodiment of FIG. 10 is very similar to the preceding one. The reflecting surface is that of a mirror which is, for example, mounted on the load bar and thus distinct from the fabric. This mirror may be mounted so as to pivot in order to be positioned against the enclosure of the blind when the fabric is folded up in its top end-of-travel position FDCH500 and to be repositioned so as to reflect the solar rays toward the panel when the fabric is unfolded in its recharging position PR500.

This embodiment makes it possible to use a smaller panel of photovoltaic cells, the solar rays being able to be reflected and concentrated toward the surface of the panel of photovoltaic cells.

In the five embodiments, the control module makes it possible to drive the power supply for the motor so as to maneuver the fabric of the blind. The control module is linked with any sensor means useful to the implementation of the operating method that is the subject of the invention, such as, for example, a solar sensor and an anemometer. The method takes into account criteria, notably criteria supplied by the sensor means, so as to optimize the energy available for the actuation of the blind and the protection thereof, without creating a behavior that is perceived by the user to be disturbing.

The control module comprises hardware and software means for implementing the method for operating the installation. To this end, it comprises a means for determining the level of energy available in the energy reserve and/or a means for determining the power that can be converted by the panel of photovoltaic cells and/or a means for comparing the level of energy available in the energy reserve with a threshold and/or a means for comparing the power that can be converted by the panel of photovoltaic cells with a threshold and/or a means for powering an electric motor according to one and/or the other of the results of the comparisons so as to displace the blind fabric.

The software means may comprise computer programs.

The method for operating the installation may also be seen as a method for automatically controlling the installation inasmuch as it implements automatic maneuverings of the blind fabric.

Figure 4:
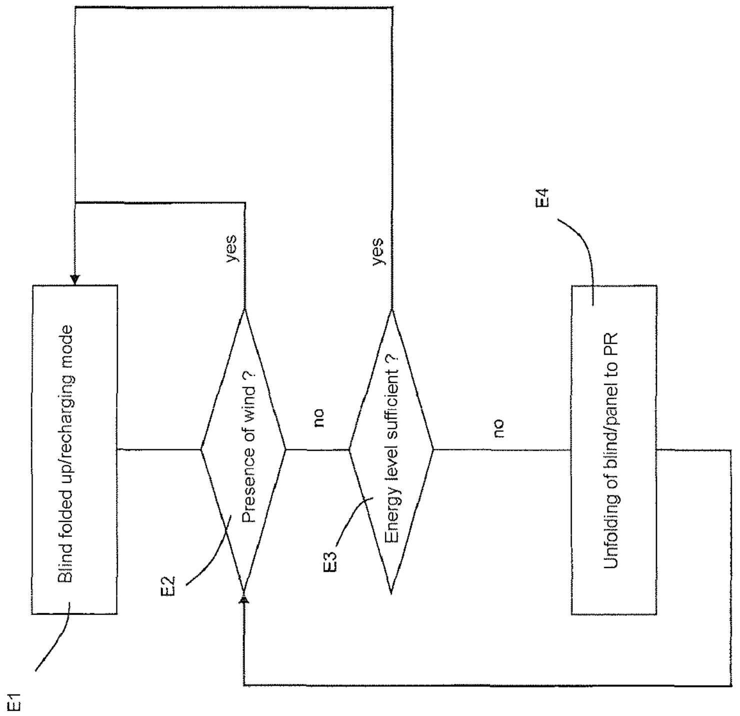
FIG. 4 is a flow diagram of a first method of executing the operating method according to the invention.

A first method of executing the operating method according to the invention is described below with reference to FIG. 4.

In a step E1, the blind is folded up and in an operating mode called recharging mode, that is to say that the installation is seeking to recharge its energy reserve. The folded-up position is generally the position in which the blind is most commonly found.

During a step E2, the presence of wind is tested. In practice, it is preferable to intervene in the management of the blind, notably to seek to recharge the energy reserve, only in the absence of wind (or when the wind speed is below a precautionary threshold). In case of the presence of wind, no action is implemented (return to the step E1). The same type of test can be implemented according to another climatic parameter, notably a parameter monitored to ensure the safety of the installation.

Otherwise, at predefined intervals during a step E3, the control module of the actuator tests whether the quantity of energy available in the energy reserve is sufficient (above a first threshold) and/or whether the contribution of energy from the panel of photovoltaic cells in the folded-up position of the blind is sufficient to recharge the energy reserve (above a second threshold). If such is the case, the method loops to the step E1 and no maneuver is implemented. The blind remains folded up.

If the energy level is insufficient and/or if the contribution of energy from the panel of photovoltaic cells is low (below the second threshold), the method continues to a step E4, during which the actuator unfolds the blind to a predetermined recharging position PR100; PR200; PR300; PR400; PR500, in which the panel of photovoltaic cells is exposed to the direct radiation. The blind is maintained in this recharging position as long as the wind remains absent and the level of energy is not complete or has not reached a threshold, and/or the contribution of energy from the photovoltaic panel falls below the second threshold.

The wind test function may also not be considered as a function that is critical for this method. In fact, the blind unfolded in its recharging position may only catch the wind slightly and may be protected from the wind by the eaves. The step E2 is therefore optional.

Figure 5:
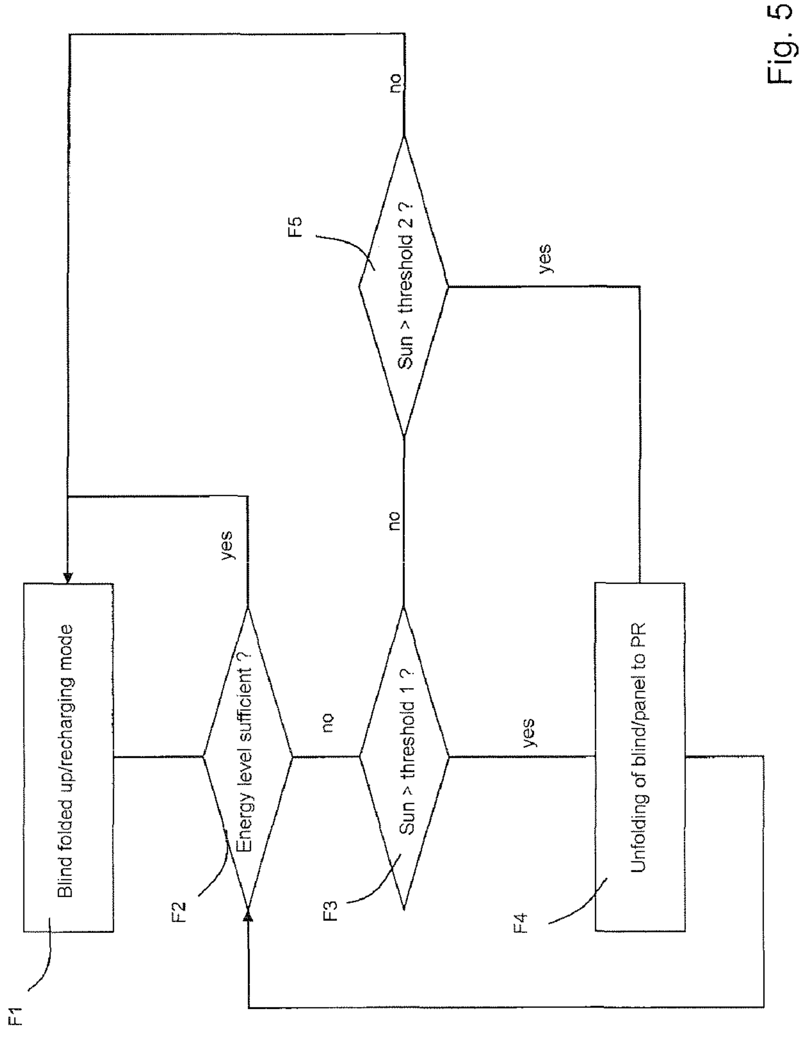
FIG. 5 is a flow diagram of a second method of executing the operating method according to the invention.

A second method of executing the operating method according to the invention is described below with reference to FIG. 5.

According to this flow diagram, in a step F1, the blind is folded up and in the operating mode called recharging mode.

During a step F2, the control module for the actuator tests whether the quantity of energy available in the energy reserve is sufficient. If it is, the method loops to the step F1 and no action is implemented. The blind remains folded up.

Otherwise, the control module tests for the presence of direct sunlight in a step F3. This step F3 depends on the presence of a solar sensor exposed to the direct sunlight.

If the presence of sunlight is detected above a first threshold s1, the actuator unfolds the blind to a predetermined recharging position (step F4), in which the panel of photovoltaic cells is exposed to the direct radiation. The level of energy stored in the energy reserve then increases progressively.

The method then loops to the step F2 for testing the level of energy. When the latter is sufficient, the control module actuates a folding up of the blind from the recharging position (return to the step F1). Otherwise, the blind remains in the recharging position for as long as the climatic parameters (wind, sunlight) retain the same values or similar values.

In the case where the presence of direct sunlight is measured below a second threshold s2 (step F5), the method loops to the step F1. No movement is actuated. The blind remains folded up. The level of lighting is too low to be of interest for recharging the installation. The threshold s2 is preferably dependent on a parameter, such as, for example, dependent on the charge of the electrical energy reserve or the capacity of the photovoltaic panel to charge this reserve. Obviously, the lower the charge of the reserve, the lower the value of the threshold s2. Similarly, the lower the charging capacity of the panel, the lower the value of the threshold s2.

If the sunlight level is above the second threshold s2, the method continues with the step F4 for unfolding of the blind to the recharging position. Thus, even in average lighting conditions (white sky, presence of clouds), the blind is placed in the preferential recharging position outside the shadow zone created by the presence of the eaves.

Figure 6:
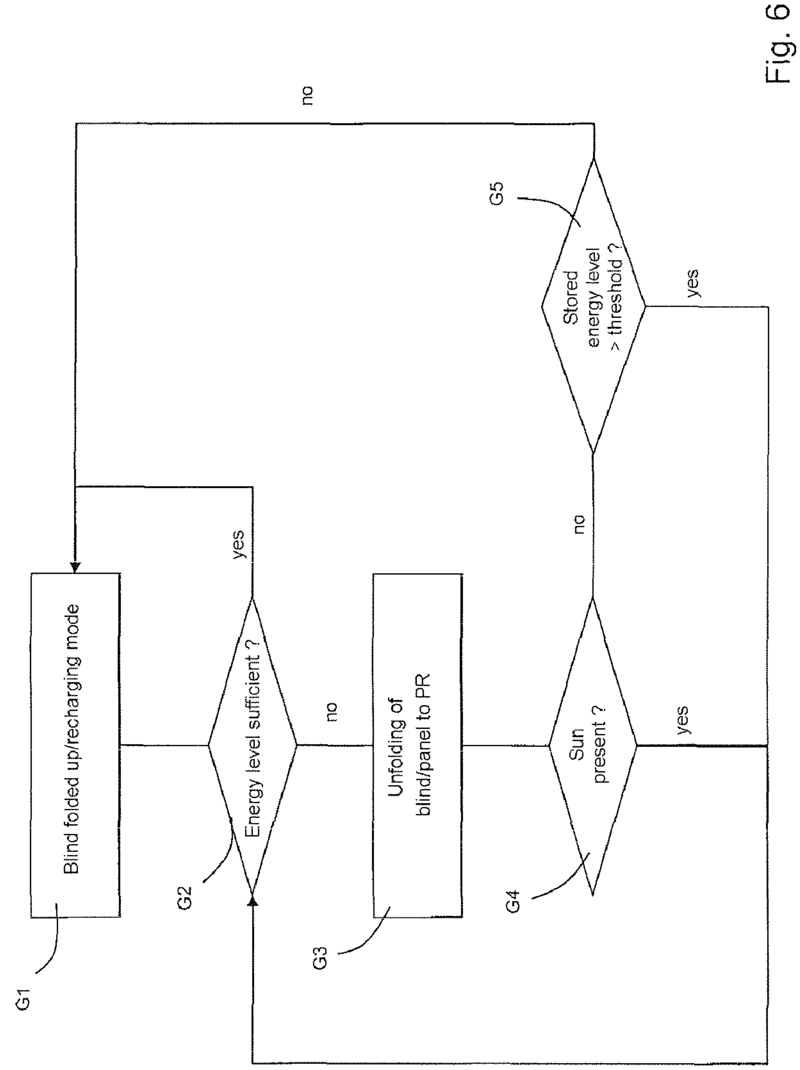
FIG. 6 is a flow diagram of a third method of executing the operating method according to the invention.

A third method of executing the operating method according to the invention is described below with reference to FIG. 6.

In a step G1, the blind is folded up and in the operating mode called recharging mode. At predefined intervals during a step G2, the control module of the actuator tests whether the quantity of energy available in the energy reserve is sufficient and/or whether the contribution of energy from the panel of photovoltaic cells in the folded-up position of the blind is sufficient (above a second threshold). If such is the case, the method loops on the step G1 and no action is implemented. The blind remains folded up.

If the level of energy is not sufficient and/or if the contribution of energy from the panel of photovoltaic cells is low (below the second threshold), the method continues to a step G3, during which the actuator unfolds the blind to a predetermined recharging position, in which the panel of photovoltaic cells is exposed to the direct radiation.

The control module itself tests the presence of direct sunlight during a step G4: in practice, if a direct solar radiation is present, the level of energy stored in the energy reserve increases progressively in a significant manner. The test for presence of sunlight is then performed directly via the panel of photovoltaic cells and the control module. This step G4 is like a measurement of the trend of stored energy (or energy produced by the panel of photovoltaic cells).

The step G4 continues as long as the energy level increases. The blind can be folded up when the maximum charge level is reached or when a threshold is exceeded. The recurrence of the energy level tests of the step G2 can then be reduced.

In the presence of direct sunlight or sunlight that is diffused by reflecting surfaces, such as in a white sky situation, the level of energy stored in the recharging position is significant. For as long as it represents a non-negligible energy, for example in the case of a blind whose panel of photovoltaic cells is fixed on the fabric, the latter being completely masked when the blind is wound up, the control module then maintains the unfolding of the blind in the recharging position. Thus, even in average lighting conditions (white sky, presence of clouds), the blind is maintained in the preferential recharging position outside the shadow zone created by the presence of the eaves.

When the stored energy rate is measured below a certain threshold value (step G5), the blind is once again wound up to its top end-of-travel position. The lighting conditions are then insufficient (gray sky, night).

The duration between two energy level tests can then be reduced to save the available energy. A normal duration may be restored when a control command is given.

Figure 7:
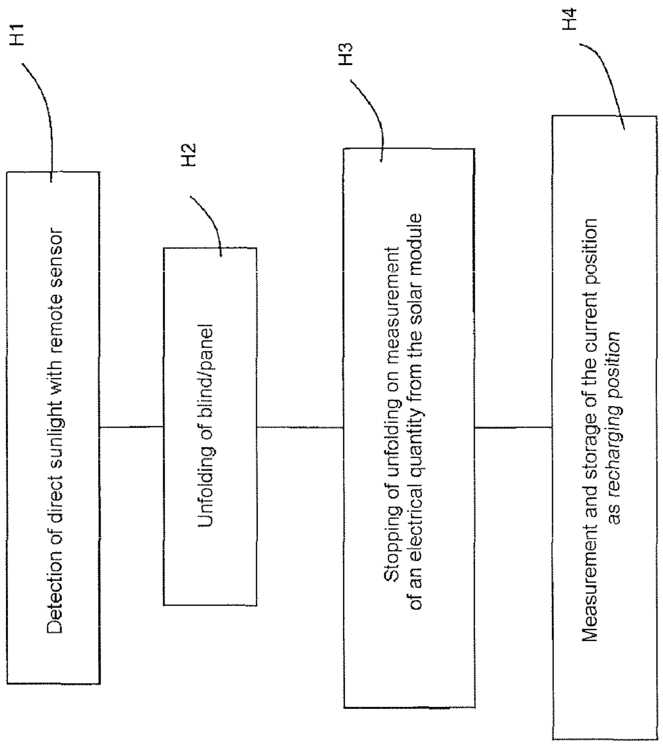
FIG. 7 is a flow diagram of a procedure for defining a particular position of the fabric that makes it possible to recharge the energy reserve.

The recharging position PR100, PR200, PR300, PR400, and PR500 may be stored following an adjustment by the installer or by automatic learning. An automatic learning procedure implemented in an installation comprising an external solar sensor exposed to the direct sunlight is described below with reference to FIG. 7.

During a first step H1 during installation or automatically as long as no recharging position is in memory, the presence of direct sunlight is detected by the remote sensor 116, 216, 316, 416, 516. A command to unfold the blind is then transmitted during a step H2 and the blind begins to unfold, thus making it possible to begin exposing the panel of photovoltaic cells to the sun's rays. This movement is stopped in the step H3, when an electrical quantity is measured (current, voltage or similar) originating from the panel of photovoltaic cells. This stoppage may be triggered by the detection of an electrical quantity value above a predefined threshold. In particular, when the panel of photovoltaic cells is exposed at least partially to the solar rays, its production of energy becomes non-zero. The measured electrical quantity reflects this sensitive energy production. The recharging position then corresponds at least to the positioning of the blind fabric such that a useful surface zone of the photovoltaic panel is exposed.

During the step H4, the current position of the blind, or its stop position is measured and placed in memory as recharging position. In practice, when the blind is unfolded to this minimum position in the presence of direct sunlight, the energy production by the portion of the panel of photovoltaic cells that is exposed is considered as sufficient.

In another embodiment, the recharging position is not defined in a fixed manner.

In case of direct sunlight detected by a remote sensor, the unfolding takes place as far as a significant measurement relating to the energy production by the panel of photovoltaic cells. The recharging position can thus be determined by the detection of a variation of voltage or of current from the panel of photovoltaic cells above a threshold. This recharging position corresponds at least to the positioning of the blind fabric such that a useful surface zone of the photovoltaic panel is exposed. Once this variation is detected, the recharging position can be determined by continuing the unfolding over a given travel (unfolding of 30 cm or unwinding by one winding axis revolution).

Other methods for determining a fixed or variable recharging position can also be envisaged. The various methods of executing the method have also been described with reference to the mobile blind with the panel. However, they are also applicable to the methods of execution of FIGS. 8 to 10.

In the various methods of execution of the method, the displacement of the panel or of the fabric from the folded-up position to the recharging position may require only very little energy. In practice, this displacement may be driven by the springs of the arms and it may therefore be necessary on the actuator only to release a brake. Nevertheless, the execution of this displacement may all the same be conditional on the fact that the reserve of energy is sufficient to subsequently ensure a folding up of the panel or of the fabric from the recharging position.

The blind may also be controlled to a so-called intermediate position that is predefined or chosen by the user and independent of the recharging position.

In different methods of execution, the power that can be converted into electrical energy by the photovoltaic panel is determined. This can be handled by various means. Notably, this determination can be done by measuring the voltage or the current produced at the terminals of the panel, or by measuring the lighting then using a mapping table between the lighting value and the power that can be converted into electrical energy.

In the various methods of execution and variants, the unfolding of the fabric to the recharging position may be done subject to certain unfolding conditions, these conditions possibly being predefined automatically or manually by an installer. For example, these conditions may relate to the type of home automation installation incorporating the fabric, to the location of the panel of photovoltaic cells on the installation, to the location of the installation on the building, notably its position and its orientation. These conditions may notably determine or be involved in determining the sequence of unfolding actions to the recharging position.

The recharging position may also be used independently of the criterion for recharging the energy reserve and in the absence of solar sensor linked to the installation, as unfolding position making it possible to detect the presence of sunlight. Thus, the invention also relates to a method for determining and/or measuring a sunlight criterion or parameter. The method then comprises a step for displacing the panel of photovoltaic cells or the fabric to a predefined recharging position in which the panel is, in the case of sunlight, exposed, directly or by reflection, to the solar rays and a step for using an energy measurement supplied by the panel to determine the sunlight criterion or parameter.

The method for determining and/or measuring a sunlight criterion or parameter may be incorporated in a method for operating a motorized solar protection home automation installation in which an unfolding of a blind fabric is also controlled according to the determined sunlight criterion or parameter.

The invention claimed is:

1. A method for operating a motorized solar protection home automation installation, comprising:

an actuator to unfold and fold up a fabric, comprising a motor and a motor control module, and a panel of photovoltaic cells that is mobile under the effect of the actuator, to supply energy to recharge a reserve of electrical energy powering the actuator, the operating method comprising the following automatic steps:

a) determination of a criterion for recharging the energy reserve, b) if the criterion is satisfied, displacement of the panel of photovoltaic cells or of the fabric to a recharging position in which the panel is exposed directly to the solar rays to recharge the energy reserve, the recharging position corresponding to a minimum position, the minimum position being such that a detected electrical output from the solar cells is greater than a predefined minimum electrical threshold, wherein in a fabric folded-up position, the panel of photovoltaic cells is sheltered from the solar rays.

2. The operating method as claimed in claim 1, wherein the recharging criterion corresponds to:

a level of energy available in the energy reserve below a first predefined threshold, and/or a power converted by the panel of photovoltaic cells when the fabric is in a completely folded-up position, below a second threshold.

3. The operating method as claimed in claim 1, wherein the recharging position is a position of partial unfolding of the fabric.

4. The operating method as claimed in claim 1, wherein, the fabric being in the recharging position, it is folded up if the rate of variation of the stored energy falls below a third threshold.

5. The operating method as claimed in claim 1, wherein the recharging position is determined by automatic learning, in particular by a procedure for controlling movements of the fabric to a position in which the ratio of the exposed surface zone of panel of photovoltaic cells to the unfolded fabric length is maximized.

6. The operating method as claimed in claim 1, wherein the recharging position is a folded-up position of the fabric in case of wind.

7. The operating method as claimed in claim 1, wherein the recharging position varies according to sunlight conditions and/or according to the orientation of the solar rays.

8. The operating method as claimed in claim 1, wherein the fabric unfolds to a recharging position during the step b) under certain unfolding conditions, these being predefined automatically or manually by an installer.

9. A method for operating a motorized solar protection home automation installation, comprising:

an actuator to unfold and fold up a fabric, comprising a motor and a motor control module, and a panel of photovoltaic cells that is mobile under the effect of the actuator, to supply energy to recharge a reserve of electrical energy powering the actuator, the operating method comprising the following automatic steps:

a) displacement of the panel of photovoltaic cells or of the fabric to a recharging position in which the panel is exposed directly to the solar rays, the recharging position corresponding to a minimum position, the minimum position being such that a detected electrical output from the solar cells is greater than a predefined minimum electrical threshold, b) use of a measurement of energy supplied by the panel to determine a sunlight criterion, c) unfolding of the fabric if the sunlight criterion exceeds a predefined threshold, wherein in a fabric folded-up position, the panel of photovoltaic cells is sheltered from the solar rays.

10. A motorized solar protection home automation installation, comprising:

an actuator to unfold and fold up a fabric, comprising a motor and a motor control module, and a panel of photovoltaic cells that is fixed or mobile under the effect of the actuator, to recharge a reserve of electrical energy powering the actuator, which comprises hardware and software means for implementing the operating method as claimed in claim 1.

11. The home automation installation as claimed in claim 10, wherein the hardware and software means comprise a means for determining the level of energy available in the energy reserve and/or a means for determining the power converted by the panel of photovoltaic cells.

12. A motorized solar protection home automation installation, comprising:

an actuator to unfold and fold up a fabric, comprising a motor and a motor control module, and a panel of photovoltaic cells that is fixed or mobile under the effect of the actuator, to recharge a reserve of electrical energy powering the actuator, which comprises hardware and software means for implementing the operating method as claimed in claim 9.

13. The operating method as claimed in claim 1, wherein the minimum position corresponds at least to a position of the fabric such that a useful surface zone of the panel of photovoltaic cells is exposed.

14. A method for operating a motorized solar protection home automation installation, comprising:

an actuator to unfold and fold up a fabric, comprising a motor and a motor control module, and a panel of photovoltaic cells that is fixed, to supply energy to recharge a reserve of electrical energy powering the actuator, the operating method comprising the following automatic steps:

a) determination of a criterion for recharging the energy reserve, b) if the criterion is satisfied, displacement of a reflecting portion to a recharging position in which the panel is exposed by reflection to the solar rays to recharge the energy reserve, the recharging position corresponding to a minimum position such that a detected electrical output from the solar cells is greater than a predefined minimum electrical threshold, wherein in a fabric folded-up position, the panel of photovoltaic cells is sheltered from the solar rays.

15. The operating method as claimed in claim 14, wherein the recharging criterion corresponds to:

a level of energy available in the energy reserve below a first predefined threshold, and/or a power converted by the panel of photovoltaic cells when the fabric is in a completely folded-up position, below a second threshold.

16. The operating method as claimed in claim 14, wherein the reflecting portion is a portion of the fabric mounted on or incorporated in the fabric.

17. The operating method as claimed in claim 14, wherein the reflecting portion is distinct from the fabric and mounted on a load bar which is fixed to the fabric.

18. A method for operating a motorized solar protection home automation installation, comprising:

an actuator to unfold and fold up a fabric, comprising a motor and a motor control module, and a panel of photovoltaic cells that is fixed, to supply energy to recharge a reserve of electrical energy powering the actuator, the operating method comprising the following automatic steps:

a) displacement of a reflecting portion to a recharging position in which the panel is exposed by reflection to the solar rays, the recharging position corresponding to a minimum position such that a detected electrical output from the solar cells is greater than a predefined minimum electrical threshold, b) use of a measurement of energy supplied by the panel to determine a sunlight criterion, c) unfolding of the fabric if the sunlight criterion exceeds a predefined threshold, wherein in a fabric folded-up position, the panel of photovoltaic cells is sheltered from the solar rays.

* * * * *